Feb. 14, 1956   C. R. HEBRANK   2,734,556
COMBINATION SEAT AND FATIGUE-RELIEVING BACK REST
Filed Dec. 18, 1953
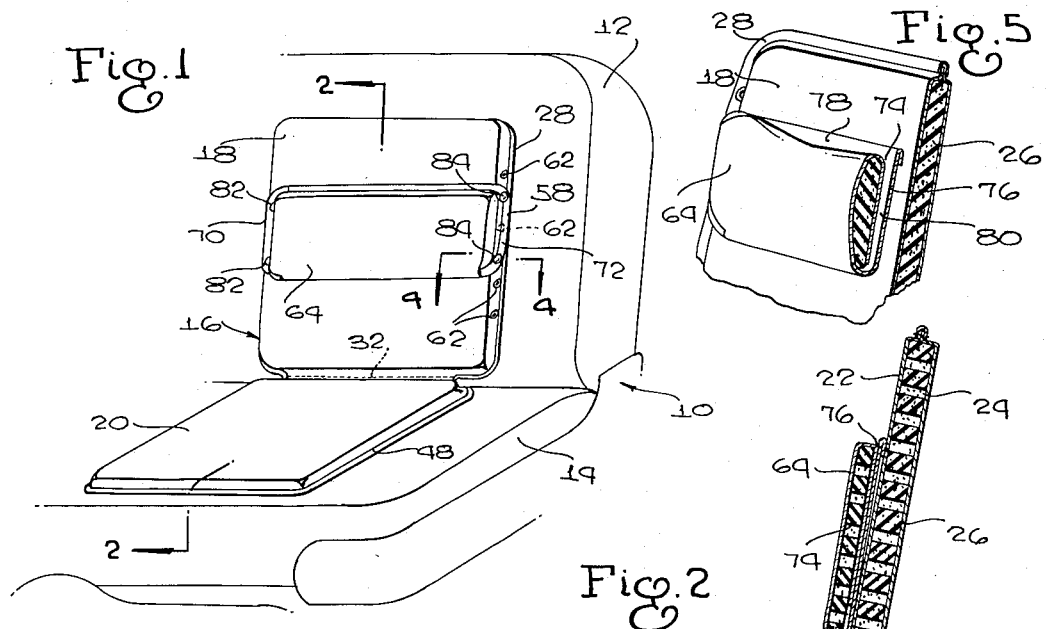
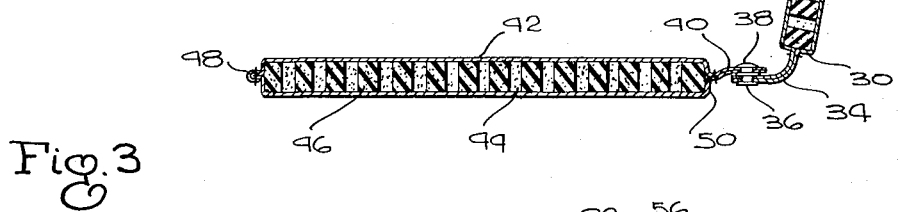
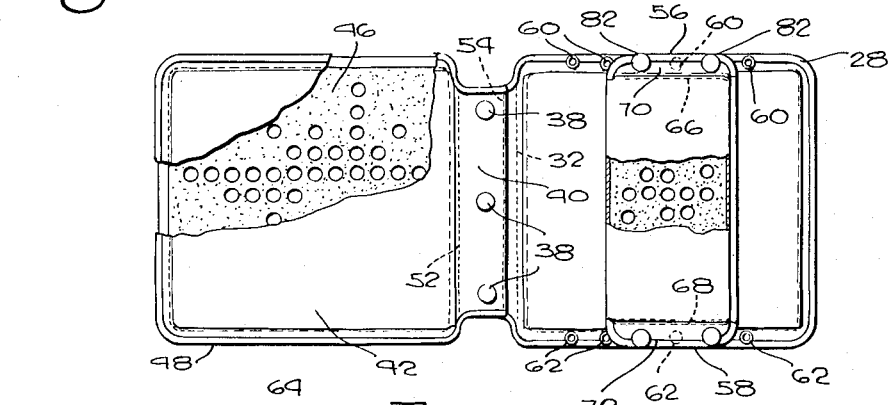
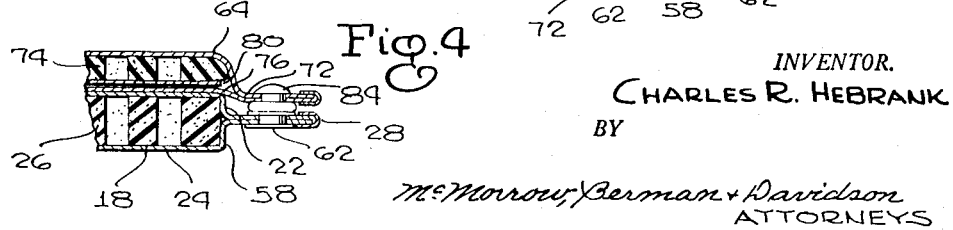
INVENTOR.
CHARLES R. HEBRANK
BY
McMorrow, Berman & Davidson
ATTORNEYS

United States Patent Office 2,734,556
Patented Feb. 14, 1956

2,734,556

COMBINATION SEAT AND FATIGUE-RELIEVING BACK REST

Charles R. Hebrank, Santa Fe, N. Mex.

Application December 18, 1953, Serial No. 399,056

2 Claims. (Cl. 155—131)

This invention relates to chairs and seats, and more particularly to a combination seat and fatigue-relieving back rest.

It is an object of this invention to provide a combined seat and back rest as an accessory upon a chair or seat, and more specifically to the seats in automotive vehicles, which is light in weight, the seat and back rest being reversible so that it can be turned to be used on either side of the seat and back rest, and in which the seat is detachably secured to the back rest so that the seat portion may be readily replaced when worn whereas the back rest which is subject to less wear, may be placed in continued use with the replacement seat portion.

It is well known that motorists and truck drivers are effected by what may be called "driver's back" which is a pain or ache in the small of the back, usually over the kidney area. This is espectially true when the motorist or truck driver is on a long trip. In order to relieve and prevent such aches in the small of the back of automotive vehicle operators, the driver or operator may roll up a coat or other article of clothing to make a pad and place it along the back rest of the seat transversely thereof so as to fit into the small of his back. Obviously, any movement of the driver will cause shifting of the pad to such extent that it becomes ineffective for the purpose intended. Other attempts have been made to place an arcuate portion of the back rest extending outwardly therefrom so as to approximately extend across the small of the back of the person using the seat. However, this latter shaping of the back rest of the seat fails to take into account the differences in size of the operators or drivers so that in some cases the small of the back will not be supported, and, as a matter of fact, will provide extreme discomfort to the driver.

Therefore, it is a principal object of the invention to provide in a combination seat and back rest, a rest pad which is adjustable longitudinally of the back rest so as to be individually and selectively secured upon the back rest to accommodate the small of the user's back despite the variance in locations of the small of the back in various persons with respect to the back rest.

Another and further object of this invention is to provide in a combination seat and back rest, a rest pad in which the amount of padding may be slected so that the rest pad may be built up if a heavier pressure pad is desirable.

Other objects and advantages will become apparent from the following detailed description, forming the specification, and taken in conjunction with the accompanying drawing, in which:

Figure 1 is a perspective view of an automotive vehicle seat with the combined seat and back rest of the present invention placed thereon;

Figure 2 is a vertical cross sectional view of the combined seat and back rest taken on line 2—2 of Figure 1;

Figure 3 is a top plan view, on a somewhat reduced scale, of the seat and back rest lying flat in end-to-end relation, parts of the seat and back rest being broken away to show interior construction;

Figure 4 is a cross sectional view taken on line 4—4 of Figure 1; and

Figure 5 is a fragmentary perspective view of the back rest and rest pad, partially in section, showing the shim pocket as well as the interior construction of the back rest and rest pad.

With continued reference to the drawing, there is shown in Figure 1 a conventional automobile seat, generally indicated at 10 having the usual back rest 12 and seat 14. The combined seat and back rest of this invention, generally indicated at 16, is shown placed upon the seat 10 so that the back rest portion 18 thereof rests against the back rest 12 of the auto seat 10 while the seat portion 20 is placed upon the top of the seat 14 in overlying relation thereto.

The back rest 18 of the combined seat and back rest 16 has a front cover 22 and a rear cover 24, preferably made of plastic fiber material, and having therebetween a layer of porous foam rubber 26, the front and side edges of the front and rear covers 22 and 24 respectively being secured together with a binding tape 28. The front and rear covers 22 and 24 are secured together along the back or rear edge 30 of the back rest 18 by a line of stitching 32, and the respective front and back covers extend beyond the lower or rear edge 30 of the back rest to provide a flap 34 in which the front and back cover material are in superimposed relation and secured together at the terminal edges thereof by suitable stitching. The flap 34 carries a plurality of spaced fastener elements 36 extending transversely thereof in the form of a female portion of a snap button type fastener. The fastener elements 36 are adapted to receive the mating fastener elements 38, in the form of a male member of the snap button type of fastener, carried in spaced apart locations on a flap 40 defined by the rearwardly extending ends of the respective front and rear covers 42 and 44 of the seat 20. The front and rear covers of the seat 20 are of the same material as the material from which the front and rear covers 22 and 24 of the back rest are made, and the front and rear covers of the seat enclose therebetween a pad or block of porous foam rubber 46. The front and side edges of the front or top cover 42 and the rear or bottom cover 44 are secured together by having stitched thereon a binding tape 48. The rear or back edge 50 of the seat 20 has the flap 40 extending outwardly therefrom, the layers of material comprising the flap 40 being secured together along the back edge 50 by a line of stitching 52 while the terminal ends or edges are secured together by a similar line of stitching 54.

The size and shape of the back rest 18 and seat 20 may be varied at will, although generally they will be generally rectangular, and the back rest will be of approximately the same size as the seat, although this, again, may be varied according to the particular use and environment to which the combined seat and back rest is to be put.

Thus, it will be seen that the back rest 18 and the seat 20 are detachably secured together along the lower end of the back rest and along the rear edge of the seat.

The overlapping material of the front and rear covers 22 and 24 which extend along the opposite longitudinal sides 56 and 58 of the back rest 18 carry a plurality of spaced fastener elements 60 and 62 respectively, the fastener elements 60 and 62 arranged in a straight line or row, and each of the fastener elements being in the form of a female member of a snap button type fastener.

Extending transversely across the back rest 18 is a foam rubber padded rest pad 64, in which the cover therefor is made of a single length of material, preferably plastic fiber, and folded transversely so as to form three equal transverse sections which are secured along the sides thereof by respective lines of stitching 66 and 68 the material extending beyond these lines of stitching to define laterally extending flaps 70 and 72 respectively when the single length of material is folded into three equal transverse sections. A porous foam rubber block or pad 74 is contained between the first two folded transverse sections of the rest pad 64 while the last section or end section 76 is open along its top edge to define an opening 78 transversely thereof between the first two sections in which the foam rubber is contained and the end panel section 76 thereby defining a pocket 80 for a purpose which will presently appear.

The flap 56 carries thereon a plurality of fastener elements 82 which are adapted to interengage with the fastener elements 60 carried by the side 56 so as to secure, detachably, the rest pad 64 on the back rest 18 at one side thereof. The other side of the rest pad, specifically, the flap 72 also carries a plurality of fastener elements 84 adapted to interengage with the selected ones of the fastener elements 62 carried on the side 58. So that the rest pad 64 will be detachably secured upon the back rest 18 and extend transversely thereacross at selected positions thereon intermediate the ends thereof since the fastener elements 82 and 84 at respective sides of the rest pad 64, which are in the nature of male members of a snap button type fastener, may be selectively interengaged with the desired ones of the rows of spaced apart fastener elements 60 and 62 respectively. This provides adjustment of the rest pad so that the rest pad will extend at the location transversely across the back rest at which the small of the back of the individual user will be located. In addition, it will be readily appreciated that with the selected adjustability of the rest pad 64, a number of persons of different size may use the same combined seat and back rest and have the rest pad extend transversely of the back rest at the exact location where the small of the user's back will be supported so as to relieve fatigue on an extended driving journey.

In the case where the rest pad 64 is required to be built up where a heavier pressure pad is desired to extend transversely across the back of the user, additional padding may be inserted into the pocket 80, which for this purpose may be considered a shim pocket, so as to provide a heavier padding therein with the resultant additional heavier pressure as desired.

From the foregoing, it will be apparent that there has been provided a combination seat and fatigue back rest which comprises a padded back rest 18, a padded seat 20 detachably secured to the back rest 18 along the lower edge 30 thereof and extends laterally therefrom, and a fatigue-relieving rest pad 64 which is detachably carried by said back rest transversely thereof, and a plurality of interengaging securing means carried by the back rest 18 and by the rest pad 64 for securing the rest pad on the back rest at selected adjusted positions transversely of the back rest intermediate the ends of the back rest. It will be noted that the rest pad 64 has a block of resilient padding 74 therein and has flaps 70 and 72 extending outwardly from opposite sides thereof with a plurality of fastener elements carried by each of the flaps, and a row of spaced complementary fastener elements carried longitudinally along opposite sides 56 and 58 of the back rest 18, the fastener elements 82 and 84 respectively on the rest pad 64 are adapted to interengage with selected ones of the fastener elements 60 and 62 respectively along respective sides of the back rest intermediate the ends thereof for the purpose hereinbefore set forth.

While there are shown and described the preferred embodiment of the invention, it is to be understood that the structure is susceptible to change and modification within the practicability of the invention and therefore should be limited only by the scope of the claims appended hereto.

What is claimed is:

1. A combination seat and fatigue-relieving back rest comprising a padded back rest, a padded seat detachably secured to said back rest at the lower end thereof, a fatigue-relieving rest pad detachably carried by said back rest transversely thereacross, said pad having a block of resilient padding therein and having flaps extending outwardly from opposite sides thereof, a plurality of fastener elements carried by each of said flaps, a row of spaced complementary fastener elements carried longitudinally along opposite sides of said back rest, the fastener elements on said rest pad adapted to interengage with selected ones of the fastener elements along respective sides of said back rest intermediate the ends thereof, said rest pad having a shim pocket formed therein to receive additional padding.

2. A combination seat and fatigue-relieving back rest comprising a back rest, a seat secured to said back rest along the lower edge thereof and extending laterally therefrom, and a fatigue-relieving rest pad carried by said back rest and extending transversely across one face thereof adjacent said seat, said rest pad having a shim pocket formed therein to receive additional padding.

References Cited in the file of this patent

UNITED STATES PATENTS

| | | |
|---|---|---|
| 305,428 | Covert | Sept. 23, 1884 |
| 1,089,040 | Block | Mar. 3, 1914 |
| 1,356,493 | Kerr | Oct. 19, 1920 |
| 1,935,685 | White | Nov. 21, 1933 |
| 2,004,106 | Gaston | June 11, 1935 |